(12) United States Patent
Nozu et al.

(10) Patent No.: US 8,700,280 B2
(45) Date of Patent: Apr. 15, 2014

(54) ROAD SURFACE FRICTIONAL COEFFICIENT ESTIMATION DEVICE, DRIVING FORCE DISTRIBUTION CONTROL DEVICE AND FOUR-WHEEL-DRIVE VEHICLE

(75) Inventors: Tomohiro Nozu, Anjo (JP); Ryohei Shigeta, Anjo (JP); Akira Kodama, Chiryu (JP); Go Nagayama, Toyama (JP); Yasushi Yagi, Hiroshima (JP); Daisuke Kofu, Hiroshima (JP); Akihiro Tatara, Aki-gun Hiroshima (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/564,280

(22) Filed: Aug. 1, 2012

(65) Prior Publication Data
US 2013/0035831 A1 Feb. 7, 2013

(30) Foreign Application Priority Data
Aug. 1, 2011 (JP) .................. 2011-168201

(51) Int. Cl.
*B60T 8/58* (2006.01)
(52) U.S. Cl.
USPC .......................................... 701/69
(58) Field of Classification Search
USPC .................... 701/41, 69, 80, 81; 180/233
See application file for complete search history.

(56) References Cited

U.S. PATENT DOCUMENTS

| 5,809,445 A * | 9/1998 | Yamamoto et al. ............. 701/74 |
| 6,498,975 B1 | 12/2002 | Lee et al. |
| 6,845,838 B2 | 1/2005 | Wakao et al. |
| 2001/0033106 A1 * | 10/2001 | Shirai et al. .................. 303/177 |
| 2002/0002433 A1 | 1/2002 | Matsuno |
| 2004/0016585 A1 | 1/2004 | Wakao et al. |
| 2005/0049774 A1 * | 3/2005 | Kogure ........................... 701/80 |
| 2005/0099146 A1 * | 5/2005 | Nishikawa et al. ............. 318/63 |
| 2006/0041365 A1 * | 2/2006 | Mori ................................. 701/70 |
| 2009/0120707 A1 * | 5/2009 | Yoneda .......................... 180/248 |
| 2009/0184572 A1 * | 7/2009 | Yamada et al. ............... 303/140 |

FOREIGN PATENT DOCUMENTS

| EP | 1 359 044 A2 | 11/2003 |
| EP | 1 359 044 A3 | 11/2003 |
| JP | 2003-312289 | 11/2003 |

(Continued)

OTHER PUBLICATIONS

U.S. Appl. No. 13/564,311, filed Aug. 1, 2012, Nozu, et al.

(Continued)

*Primary Examiner* — Mary Cheung
*Assistant Examiner* — Rodney Butler
(74) *Attorney, Agent, or Firm* — Oblon, Spivak, McClelland, Maier & Neustadt, L.L.P.

(57) ABSTRACT

A road surface frictional coefficient estimation device includes: a first straight travel determination unit configured to determine whether or not a vehicle travels straight based on a rotational speed difference between a plurality of wheels of the vehicle; a second straight travel determination unit configured to determine whether or not the vehicle travels straight based on a steering angle of the vehicle; a selection unit configured to select one of determination results of the first straight travel determination unit and the second straight travel determination unit; and a frictional coefficient estimation unit configured to estimate a frictional coefficient of a road surface on which the vehicle travels when the one of the determination results selected by the selection unit indicates that the vehicle travels straight.

8 Claims, 3 Drawing Sheets

(56) References Cited

FOREIGN PATENT DOCUMENTS

| | | |
|---|---|---|
| JP | 2005-53423 | 3/2005 |
| JP | 2005-53423 A | 3/2005 |
| JP | 2005-053423 A | 3/2005 |

OTHER PUBLICATIONS

U.S. Appl. No. 13/564,329, filed Aug. 1, 2012, Nozu, et al.
Extended European Search Report issued Dec. 5, 2012, in European Patent Application No. 12178804.6.

* cited by examiner

ROAD SURFACE FRICTIONAL COEFFICIENT ESTIMATION DEVICE, DRIVING FORCE DISTRIBUTION CONTROL DEVICE AND FOUR-WHEEL-DRIVE VEHICLE

BACKGROUND OF THE INVENTION

The present invention relates to a road surface frictional coefficient estimation device which estimates a frictional coefficient of a road surface on which a vehicle travels, a driving force distribution control device that controls driving force distribution between front and rear wheels of a four-wheel-drive vehicle, and a four-wheel-drive vehicle.

In the related art, there has been a four-wheel-drive vehicle which determines whether or not a road is a low μ road based on a rotational difference between front and rear wheels of the four-wheel-drive vehicle, and controls driving force to be transmitted to the rear wheels side based on the determination result (for example, see Patent Document 1).

The four-wheel-drive vehicle disclosed in Patent Document 1 includes tight corner braking preventing means for avoiding a tight corner braking phenomenon during turning with a large steering angle by reducing the engaging force of a clutch transmitting the driving force to the rear wheels, low μ road determination means for determining whether or not a road is a low μ road, and low μ road means for not reducing the engaging force of the clutch when it is determined that the road is a low μ road.

(Patent Document 1) JP-A-2003-312289

However, since a rotational difference between the front wheels and the rear wheels is also generated by the difference between track followed by the front and rear inner wheels during turning, the determination whether or not the road is a low μ road can be accurately performed only while traveling straight. That is, in a case of traveling straight, due to the difference between the driving force of the front wheel and the driving force of the rear wheel, the front wheel to which the great driving force is transmitted compared to the rear wheel easily slips, and it is possible to estimate the frictional coefficient of the road surface based on the rotational difference between the front wheels and the rear wheels. However, since the rear wheel passes further on the inside compared to the front wheel during turning, if the frictional coefficient of the road surface is calculated based on the rotational difference due to the difference between track followed by the front and rear inner wheels during turning, there is a possibility that a high μ road is erroneously determined as a low μ road.

In order to prevent such an erroneous determination, for example, a method of determining whether or not a vehicle travels straight with reference to a steering angle of a steering device, and determining the frictional coefficient of the road surface based on the rotational difference between the front wheels and the rear wheels when determining that the vehicle travels straight, is considered. However, depending on the type of the steering device, after the ignition is turned on and the traveling is started, it is not possible to decide a neutral position (an angular position of a steering wheel during traveling straight) of the steering angle for a time period and thus it is not possible to accurately detect the steering angle. This is a specific problem in a steering device to which a relative angle sensor having a relatively simple configuration capable of detecting the speed and the direction of the steering is applied rather than an absolute angle sensor capable of detecting an absolute value of the steering angle.

That is, in this type of the steering device, since it is possible for a steering operation to be performed in a state where the engine is stopped after the ignition has been turned off, while the ignition is on, the neutral position is decided based on a traveling state each time when the ignition is turned on without using information of the steering angle before the last time when the ignition is turned off, and thus it is not possible to accurately obtain information of the steering angle until the neutral position is decided.

In such a steering device, based on detection values of a yaw rate and a transverse acceleration of a vehicle, it is determined whether or not the position of the steering wheel corresponds to a straight traveling state of the vehicle, and the steering angle at a time point when the position of the steering wheel corresponds to the straight traveling state of the vehicle is stored as a neutral position. Accordingly, after the traveling is started, until the vehicle enters a stable straight traveling state and the neutral position of the steering angle is decided, it is not possible to determine whether or not the vehicle travels straight based on the steering angle. For this reason, the estimation of the frictional coefficient of the road surface also can not be performed, and, for example, when there is a need for turning with a large steering angle immediately after starting, as a vehicle exit time from a parking lot, there is a case where it is not possible to perform the suitable control depending on the frictional coefficient of the road surface.

SUMMARY

This invention provides a road surface frictional coefficient estimation device, a driving force distribution control device, and a four-wheel-drive vehicle capable of estimating the road surface frictional coefficient even if the neutral position of the steering angle is not decided.

An aspect of the invention provides a road surface frictional coefficient estimation device comprising: a first straight travel determination unit configured to determine whether or not a vehicle travels straight based on a rotational speed difference between a plurality of wheels of the vehicle; a second straight travel determination unit configured to determine whether or not the vehicle travels straight based on a steering angle of the vehicle; a selection unit configured to select one of determination results of the first straight travel determination unit and the second straight travel determination unit; and a frictional coefficient estimation unit configured to estimate a frictional coefficient of a road surface on which the vehicle travels when the one of the determination results selected by the selection unit indicates that the vehicle travels straight.

The vehicle may include a pair of left and right main drive wheels to which, when driving force of a drive source is transmitted to drive wheels, the driving force of the drive source is always transmitted, and a pair of left and right auxiliary drive wheels to which the driving force of the drive source is transmitted depending on a traveling state of the vehicle, and the first straight travel determination unit may determine whether or not the vehicle travels straight based on a rotational speed difference between the pair of left and right auxiliary drive wheels.

The selection unit may select the determination result of the first straight travel determination unit when a neutral position of the steering angle is not decided, and the selection unit may select the determination result of the second straight travel determination unit when the neutral position of the steering angle is decided.

An aspect of the invention provides a driving force distribution control device mounted on a vehicle including a pair of left and right main drive wheels to which, when driving force of a drive source is transmitted to drive wheels, the driving force of the drive source is always transmitted, and a pair of left and right auxiliary drive wheels to which the driving force of the drive source is transmitted depending on a traveling state of the vehicle, the driving force distribution control device comprising: a control device configured to obtain the driving force to be transmitted to the auxiliary drive wheels, the control device comprising: a first straight travel determination unit configured to determine whether or not the vehicle travels straight based on a rotational speed difference between the pair of left and right auxiliary drive wheels; a second straight travel determination unit configured to determine whether or not the vehicle travels straight based on a steering angle of the vehicle; a selection unit configured to select one of determination results of the first straight travel determination unit and the second straight travel determination unit; a frictional coefficient estimation unit configured to estimate a frictional coefficient of a road surface on which the vehicle travels when the one of the determination results selected by the selection unit indicates that the vehicle travels straight; and a driving force calculation unit configured to calculate the driving force to be transmitted to the auxiliary drive wheels based on the frictional coefficient estimated by the frictional coefficient estimation unit; and a driving force transmitting device configured to transmit driving force depending on the driving force obtained by the control device to the auxiliary drive wheels.

An aspect of the invention provides a four-wheel-drive vehicle comprising: a drive source configured to generate a driving force; a pair of left and right main drive wheels to which, when the driving force of the drive source is transmitted to drive wheels, the driving force of the drive source is always transmitted; a pair of left and right auxiliary drive wheels to which the driving force of the drive source is transmitted depending on a traveling state of the vehicle; a steering device configured to steer front wheels which are one of the pair of left and right main drive wheels and the pair of left and right auxiliary drive wheels depending on an operation of a steering wheel; a steering angle sensor configured to detect a steering angle of the steering wheel; a control device configure to obtain the driving force to be transmitted to the auxiliary drive wheels, the control device comprising: a first straight travel determination unit configured to determine whether or not the vehicle travels straight based on a rotational speed difference between the pair of left and right auxiliary drive wheels; a second straight travel determination unit configured to determine whether or not the vehicle travels straight based on the steering angle detected by the steering sensor; a selection unit configured to select one of determination results of the first straight travel determination unit and the second straight travel determination unit; a frictional coefficient estimation unit configured to estimate a frictional coefficient of a road surface on which the vehicle travels when the one of the determination results selected by the selection unit indicates that the vehicle travels straight; and a driving force calculation unit configured to calculate the driving force to be transmitted to the auxiliary drive wheels based on the frictional coefficient estimated by the frictional coefficient estimation unit; and a driving force transmitting device configured to transmit driving torque depending on the driving torque obtained by the control device to the auxiliary drive wheels.

DETAILED DESCRIPTION OF EMBODIMENTS

Embodiment

Figure 1:
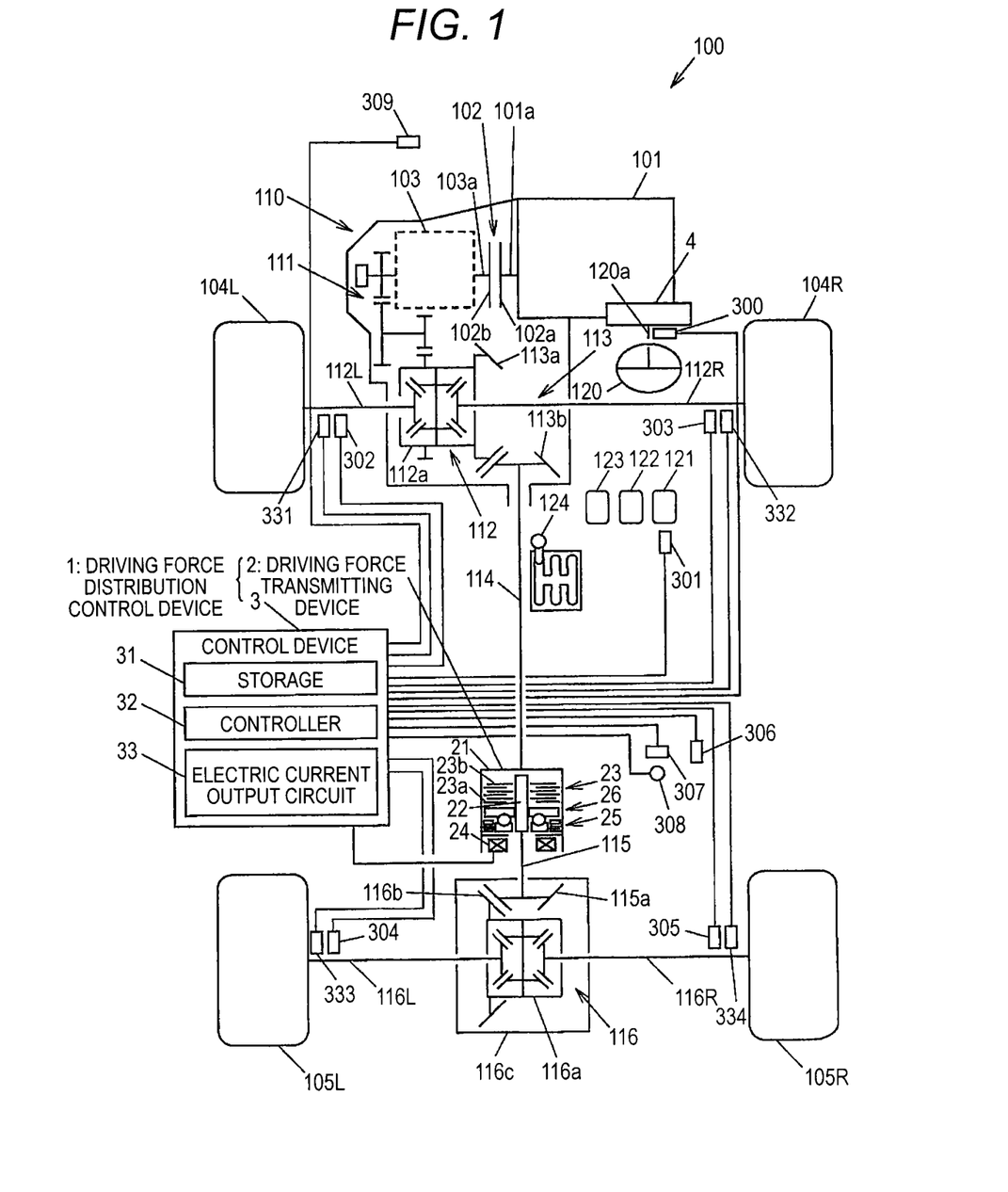
FIG. 1 is a schematic diagram that illustrates a configuration example of a four-wheel-drive vehicle according to an embodiment of the present invention.

FIG. 1 is a schematic diagram that illustrates a configuration example of a four-wheel-drive vehicle according to an embodiment of the present invention. As shown in FIG. 1, a four-wheel-drive vehicle 100 is equipped with an engine 101 as a driving source, a transmission 103 as a gearbox that changes output of the engine 101, a clutch 102 which engages an output shaft 101a of the engine 101 with an input shaft 103a of the transmission 103, a driving force transmission system 110 which transmits output of the transmission 103 to a pair of left and right front wheels 104 (a left front wheel 104L and a right front wheel 104R) and a pair of left and right rear wheels 105 (a left rear wheel 105L and a right rear wheel 105R) so as to be switchable into a two-wheel-drive state and a four-wheel-drive state, a driving force distribution control device 1, and a steering device 4 which steers the front wheels 104. The driving force distribution control device 1 includes a driving force transmitting device 2 capable of adjusting transmission torque, and a control device 3 that controls the driving force transmitting device 2. The driving force transmitting device 2 is able to switch the traveling state of the four-wheel-drive vehicle 100 into the two-wheel-drive state and the four-wheel-drive state. Furthermore, the control device 3 has a function as a road surface frictional coefficient estimation device that estimates the frictional coefficient of the road surface.

Furthermore, in a vehicle interior of the four-wheel-drive vehicle 100, for performing an operation by a driver, a steering wheel 120, an accelerator pedal 121, a brake pedal 122, a clutch pedal 123, and a shift lever 124 are provided.

The engine 101 is an internal combustion engine which is supplied with fuel depending on an amount of depression of the accelerator pedal 121, and outputs driving force for causing the four-wheel-drive vehicle 100 to run from the output shaft 101a connected to the clutch shaft. In addition, an electric motor may be used as a driving source of the four-wheel-drive vehicle 100 instated of the engine 101.

The clutch 102 includes a first disk 102a connected to the output shaft 101a of the engine, and a second disk 102b connected to the input shaft 103a of the transmission 103. The first disk 102a and the second disk 102b come into pressure-contact with each other, whereby the clutch 102 engages the output shaft 101a of the engine with the input shaft 103a of the transmission 103. The transmission 103 changes the gear ratio into a plurality of stages on the gear operation by the driver using the shift lever 124 and shifts the rotation of the input shaft 103a.

The steering device 4 steers the left front wheel 104L and the right front wheel 104R depending on the turning operation of the steering wheel 120 by the driver. As the steering device 4, various types can be applied such as a rack and pinion type, a ball screw type or a gear variable type.

(Configuration of Driving Force Transmission System)

The driving force transmission system 110 includes a front differential device 112 which distributes torque to the left front wheel 104L and the right front wheel 104R, a gear mechanism 111 which transmits torque of the output shaft of the transmission 103 to a differential case 112a of the front differential device 112, a transfer 113 which includes an input gear 113a connected to the differential case 112a and an output gear 113b having a rotational axis perpendicular to the input gear 113a and meshed with the input gear 113a, a propeller shaft 114 connected to the output gear 113b, a driving force transmitting device 2, a pinion gear shaft 115 to which torque of the propeller shaft 114 is transmitted via the driving force transmitting device 2, and a rear differential device 116 which distributes torque transmitted to the pinion gear shaft 115 into the left rear wheel 105L and the right rear wheel 105R.

The driving force transmission system 110 includes drive shafts 112L and 112R respectively connected to a pair of side gears of the front differential device 112, and drive shafts 116L and 116R respectively connected to a pair of side gears of the rear differential device 116. The drive shafts 112L and 112R transmit torque to the left front wheel 104L and the right front wheel 104R, and the drive shafts 116L and 116R transmit torque to the left rear wheel 105L and the right rear wheel 105R.

A ring gear 116b is provided on an outer peripheral portion of the differential case 116a of the rear differential device 116 in a relatively non-rotatable manner. The ring gear 116b is meshed with the gear part 115a of the pinion gear shaft 115 and transmits torque from the pinion gear shaft 115 to the differential case 116a.

Among the respective components of the driving force transmission system 110 mentioned above, the transfer 113, the propeller shaft 114, the pinion gear shaft 115, the rear differential device 116, and the drive shafts 116L and 116R are an example of a driving force transmitting member that transmits driving force of the engine 101 to the rear wheels 105.

In the driving force transmission system 110, torque output from the transmission 103 is always transmitted to the left front wheel 104L and the right front wheel 104R by such a configuration. Furthermore, torque is transmitted to the left rear wheel 105L and the right rear wheel 105R by the operation of the driving force transmitting device 2 depending on the traveling state of the four-wheel-drive vehicle 100 when required. That is, in the four-wheel-drive vehicle 100 of the present embodiment, the left front wheel 104L and the right front wheel 104R are main drive wheels and the left rear wheel 105L and the right rear wheel 105R are auxiliary drive wheels.

(Configuration of Control Device)

The control device 3 constituting the driving force distribution control device 1 includes a storage 31 constituted by a ROM, a RAM or the like, a controller 32 constituted by a calculation processing device such as a CPU, and an electric current output circuit 33 controlled by the controller 32. The controller 32 is operated based on program stored in the storage 31, and thus, the control device 3 determines a value of command torque to be transmitted to the rear wheel 105 by the calculation, based on a rotational difference between the front wheels 104 and the rear wheels 105 of the four-wheel-drive vehicle 100 and an amount of acceleration operation by the driver.

The electric current output circuit 33 supplies electric current depending on the command torque determined by the calculation processing of the controller 32 to the driving force transmitting device 2. The electric current output circuit 33 is, for example, an inverter circuit that outputs electric current to be supplied from a battery (not shown) by adjusting an amount of electric current using a PWM (Pulse Width Modulation) control.

Detection signals of a steering angle sensor 300 for detecting the steering angle of the steering shaft 120a connected to the steering wheel 120, and an accelerator opening degree sensor 301 for detecting an accelerator opening degree (an amount of acceleration operation) depending on an amount of depression of the accelerator pedal 121 are input to the control device 3. Furthermore, detection signals of vehicle speed sensors 302 to 305 respectively provided for the left front wheel 104L, the right front wheel 104R, the left rear wheel 105L and the right rear wheel 105R for detecting the rotational speed of each vehicle wheel are input to the control device 3.

Furthermore, detection signals of a longitudinal acceleration sensor 306 for detecting acceleration of the four-wheel-drive vehicle 100 in a longitudinal direction, a transverse acceleration sensor 307 for detecting acceleration in a transverse direction (a vehicle width direction), a yaw rate sensor 308 for detection a yaw rate, an outside temperature sensor 309 for detecting an outside temperature, and load sensors 331, 332, 333 and 334 for detecting load of the left and right front wheels 104L and 104R and the left and right rear wheels 105L and 105R, are input to the control device 3. The outside temperature sensor 309 is provided, for example, inside a front bumper (not shown) of the four-wheel-drive vehicle 100.

The detection signals of the respective sensors 300 to 308 may be directly input to the control device 3 via a signal line connected to the sensor main body, and may be input to the control device 3 by communication through an in-vehicle network such as a CAN (controller Area Network).

(Configuration of Driving Force Transmitting Device 2)

The driving force transmitting device 2 includes a cylindrical outer housing 21 with a bottom, which is connected to the propeller shaft 114, a cylindrical inner shaft 22 connected to the pinion gear shaft 115, and a main clutch 23 formed of a plurality of frictional plates arranged between the inner peripheral surface of the outer housing 21 and the outer peripheral surface of the inner shaft 22. The main clutch 23 is constituted by alternately arranging a plurality of outer clutch plates 23a spine-fitted to the outer housing 21 in a relatively non-ratable manner, and a plurality of inner clutch plates 23b spine-fitted to the inner shaft 22 in a relatively non-rotatable manner.

Furthermore, between the outer housing 21 and the inner shaft 22, an annular electromagnetic coil 24 for generating pressing force axially pressing the main clutch 23, a pilot clutch 25 pressed by the electromagnetic force of the electromagnetic coil 24, and a cam mechanism 26 for converting rotational force transmitted via the pilot clutch 25 into an axial thrust force pressing the main clutch 23 are arranged.

Excitation current is supplied from the electric current output circuit 33 of the control device 3 to the electromagnetic coil 24. When excitation current is supplied to the electromagnetic coil 24, rotational force of the outer housing 21 is transmitted to the cam mechanism 26 via the pilot clutch 25 by electromagnetic force, and thrust force pressing the main clutch 23 is generated by the operation of the cam mechanism 26. As a result, driving force transmitted from the outer housing 21 to the inner shaft 22 is changed depending on excitation current supplied to the electromagnetic coil 24.

(Operation of Control Device 3)

Figure 2:
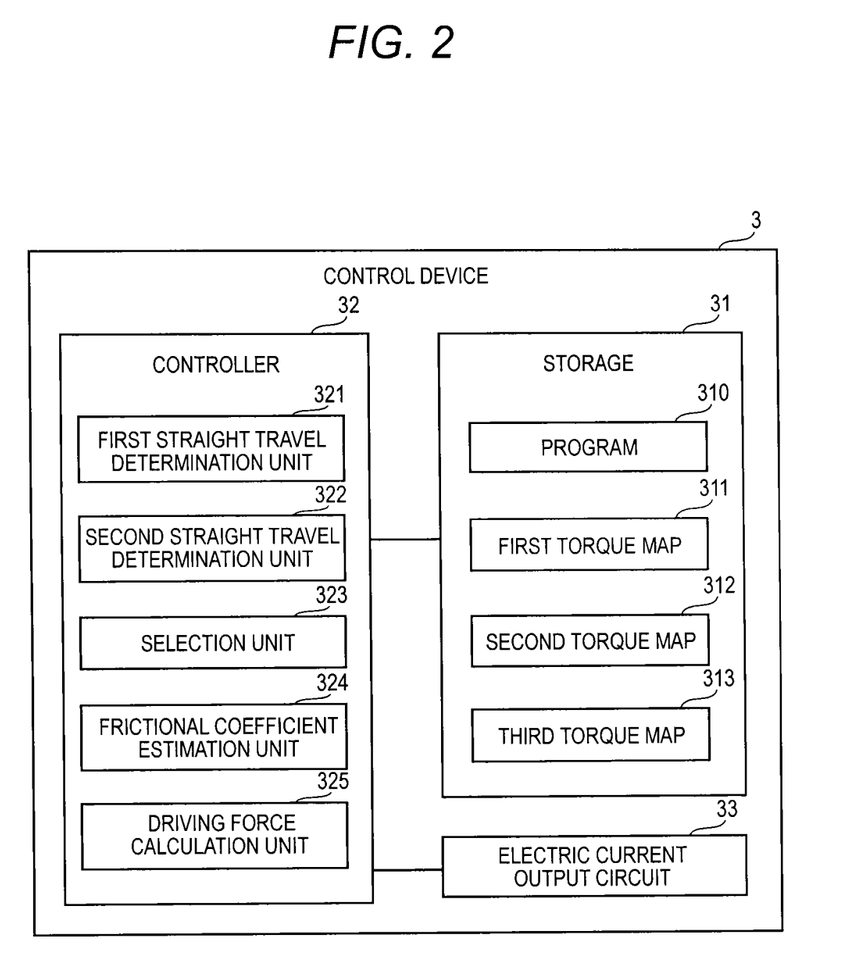
FIG. 2 is a block diagram that illustrates a functional configuration of a control device.

FIG. 2 is a block diagram that illustrates a functional configuration of the control device 3. The controller 32 functions as a first straight travel determination unit 321, a second straight travel determination unit 322, a selection unit 323, a frictional coefficient estimation unit 324, and a driving force calculation unit 325, by being operated based on program 310 stored in the storage 31.

(Function of First Straight Travel Determination Unit 321)

The first straight travel determination unit 321 determines whether or not the four-wheel-drive vehicle 100 travels straight based on the rotational speed difference between the left rear wheel 105L and the right rear wheel 105R. More specifically, the first straight travel determination unit 321 calculates the rotational speeds of the left rear wheel 105L and the right rear wheel 105R based on the detection signals of the vehicle wheel speed sensors 304 and 305, and determines that the four-wheel-drive vehicle 100 travels straight when the rotational speed difference between the left rear wheel 105L and the right rear wheel 105R is equal to or less than a predetermined threshold value.

The predetermined threshold value is set in accordance with the rotational speed difference between the left rear wheel 105L and the right rear wheel 105R, which can be generated when the four-wheel-drive vehicle 100 travels straight substantially. For example, in a case where it is determined whether or not the vehicle travels straight based on a ratio of the rotational speed difference (an absolute value of the rotational speed difference between the left rear wheel 105L and the right rear wheel 105R) to an average value of the rotational speed between the left rear wheel 105L and the right rear wheel 105R, the predetermined threshold value can be, for example, 1 to 3%. Furthermore, in a case where the absolute value of the difference between the rotational speed of the left rear wheel 105L and the rotational speed of the right rear wheel 105R is equal to or less than a predetermined value, it may be determined that the vehicle travels straight.

(Function of Second Straight Travel Determination Unit 322)

The second straight travel determination unit 322 determines whether or not the four-wheel-drive vehicle 100 travels straight based on the detection signal of the steering angle sensor 300. The steering angle sensor 300 is a relative angle sensor capable of detecting a rotational direction and a rotational speed of the steering wheel 120, and is configured so as to generate a pulse signal for each predetermined angle (for example, 2°) along with the rotation of the steering wheel 120. Thus, the second straight travel determination unit 322 is able to detect the steering angle, on the basis of a neutral position that corresponds to an angular position of the steering wheel 120 during the straight travel, by adding the pulse number during rotation in a normal direction from the neutral position and subtracting the pulse number during rotation in an opposite direction from the neutral position. In addition, information of the steering angle may be acquired from the steering device 4.

Moreover, the second straight travel determination unit 322 determines that the four-wheel-drive vehicle 100 travels straight when the steering angle is within a predetermined range including the neutral position. The predetermined range can be set to, for example, a range in which the rotational angle of the steering wheel 120 from the neutral position is within 2°.

(Function of Selection Unit 323)

The selection unit 323 selects which determination result is adopted among the first straight travel determination unit 321 and the second straight travel determination unit 322. The selection unit 323 may select and operate one of the first straight travel determination unit 321 and the second straight travel determination unit 322 to adopt the determination result of the selected one of the first and second straight travel determination units 321 and 322, and may adopt one of the determination results of the first straight travel determination unit 321 and the second straight travel determination unit 322.

In the present embodiment, when the neutral position of the steering angle is not decided, the determination result of the first straight travel determination unit 321 is adopted, and after the neutral position of the steering angle is decided, the determination result of the second straight travel determination unit 322 is adopted.

For example, in a case where the steering angle is not changed for a predetermined time or more during the traveling of the four-wheel-drive vehicle 100, the decision of the neutral position can be performed by setting the angular position of the steering wheel 120 as the neutral position of the steering angle. Furthermore, while the four-wheel-drive vehicle 100 travels, the rotational position of the steering wheel 120 at a time when the acceleration in the transverse direction detected by the transverse acceleration sensor 311 is a value (near zero) showing the straight travel may be decided as the neutral position of the steering angle.

Alternatively, it is determined whether or not the neutral position is decided based on information acquired from the steering device 4, the determination result of the first straight travel determination unit 321 may be adopted when the neutral position of the steering angle is not decided, and the determination result of the second straight travel determination unit 322 may be adopted after the neutral position of the steering angle is decided.

(Function of Frictional Coefficient Assumption Unit 324)

The frictional coefficient estimation unit 324 estimates a frictional coefficient μ of a road surface on which the four-wheel-drive vehicle 100 travels, when the first straight travel unit 321 or the second straight travel unit 322 which is selected by the selection unit 323 determines that the vehicle travels straight. The estimation of the frictional coefficient μ can be performed, for example, based on a total sum (drive torque) to be transmitted to the left and right front wheels 140L and 104R and the left and right rear wheels 105L and 105R, torque to be transmitted to the left and right rear wheels 105L and 105R, load of the main drive wheels detected based on the detection signals of the load sensors 331 and 332 of the left and right front wheels 104L and 104R, and a tire diameter of the left and right front wheels 104L and 104R. The torque to be transmitted to the left and right rear wheels 105L and 105R may be calculated based on the operation state or the like of the driving force transmitting device 2, and may be detected by the torque sensors. The tire diameter of the left and right front wheels 104L and 104R can use, for example, a preset value.

The calculation of the frictional coefficient μ is, for example, performed as below. Firstly, the frictional coefficient estimation unit 324 subtracts the torque of the rear wheels 105L and 105R which are the auxiliary drive wheels from the drive torque to obtain torque of the front wheels 104L and 104R which are the main drive wheels. Moreover, the frictional coefficient estimation unit 324 divides the torque of the main drive wheels by the tire diameter and further by the load of the main drive wheels, thereby calculating the frictional coefficient μ of the road surface to the tire.

The calculated frictional coefficient μ is compared to a threshold value, when the frictional coefficient μ is greater than the threshold value, it is possible to determine that the road surface is a high μ road, and when the frictional coefficient μ is equal to or less than the threshold value, it is possible to determine that the road surface is a low μ road such as a wet road and a frozen road.

In addition, for example, the frictional coefficient estimation unit 324 may estimate the frictional coefficient by further considering the outside temperature detected by the outside temperature sensor 309. That is, during the low temperature at which freezing of the road surface and accumulation of snow can occur, the frictional coefficient of the road surface may be estimated to be low.

(Function of Driving Force Calculation Unit 325)

The driving force calculation unit 325 determines driving force to be transmitted to the rear wheels 105 by the calculation based on the frictional coefficient μ of the road surface estimated by the frictional coefficient estimation unit 324. Hereinafter, the driving force to be transmitted to the rear wheels 105 calculated by the driving force calculation unit 325 is referred to as a "command torque tc".

More specifically, the driving force calculation unit 325 has a normal control function of calculating the command torque tc based on the rotational speed difference between the front wheels 104 and the rear wheels 105, the drive torque, and the steering angle, and has a correction function of correcting the command torque tc calculated by the normal control function based on the frictional coefficient μ estimated by the frictional coefficient estimation unit 324. Next, a specific example of the normal control function and the correction function will be described.

(Normal Control Function)

The controller 32 of the control device 3 calculates the command torque tc based on a sum of a first torque t1 based on the rotational speed difference between the front wheels 104 and the rear wheels 105, a second torque t2 based on the output torque of the engine 101 and a selected gear stage of the transmission 103 or the like, and a third torque t3 based on the steering angle.

In the calculation of the first torque t1, a rotational speed Vf (an average rotational speed of the left and right front wheels 104L and 104R) of the front wheels 104 is calculated based on the detection signals of the vehicle wheel speed sensors 302 and 303 respectively provided for the left and right front wheels 104L and 104R, and a rotational speed Vr (an average rotational speed of the left and right rear wheels 105L and 105R) of the rear wheels 105 is calculated based on the detection signals of the vehicle wheel speed sensors 304 and 305 respectively provided for the left and right rear wheels 105L and 105R. Moreover, a rotational speed difference ΔV (ΔV=Vf−Vr) of the front and rear wheels is obtained by subtracting the rotational speed Vr of the rear wheels 105 from the rotational speed Vf of the front wheels 104.

Moreover, the first torque t1 is determined with reference to a first torque map 311, stored in the storage 31, indicating a relationship between the rotational speed difference ΔV and the first torque t1. The first torque map 311 is set so that the greater the rotational speed difference ΔV is, the greater the first torque t1 is. As a result, for example, when a slip occurs in the left front wheel 104L or the right front wheel 104R, it is possible to distribute a larger proportion of the driving force of the engine 101 to the rear wheels 105 to suppress the slip. In addition, the first torque t1 may be changed by the vehicle speed S. The vehicle speed S can be obtained, for example, by multiplying the sum of the rotational speed Vf of the front wheels 104 and the rotational speed Vr of the rear wheels 105 by a predetermined coefficient.

In the calculation of the second torque t2, the second torque t2 is determined with reference to a second torque map 312, stored in the storage 31, indicating a relationship between the second torque t2 and the sum (drive torque) of torque transmitted to the left and right front wheels 104L and 104R and the left and right rear wheels 105L and 105R. The drive torque can be determined by the calculation, for example, based on the output torque of the engine 101, the selected gear stage of the transmission 103, and the final reduction ratio in the driving force transmission system 110.

The second torque map 312 is set so that, when the drive torque is less than a predetermined value, the second torque t2 is increased depending on an increase of the drive torque or a constant value, and when the drive torque is equal to or greater than the predetermined value, the second torque t2 is increased depending on an increase of the drive torque by an increasing ratio greater than that in a case where the drive torque is less than the predetermined value. The predetermined value is a value that is set depending on a grip limit torque of the left and right front wheels 104L and 104R.

As a result, for example, the great driving force of the engine 101 during the sudden acceleration is uniformly distributed to the front wheels 104 and the rear wheels 105, and thus it is possible to avoid the slip of the left front wheel 104L or the right front wheel 104R that can occur when the driving force is concentrated on the left and right front wheels 104L and 104R serving as the main drive wheels. In addition, the second torque t2 may be further changed by the vehicle speed S.

In the calculation of the third torque t3, the steering angle of the steering shaft 120a is detected based on the detection signal of the steering angle sensor 300, and the third torque t3 is determined with reference to a third torque map 313, stored in the storage 31, indicating a relationship between the steering angle and the third torque t3. The third torque map 313 is set so that, the greater the steering angle is, the greater the third torque t3 is.

As a result, it is possible to suppress the deterioration of the fuel efficiency by stabilizing the vehicle behavior of the four-wheel-drive vehicle 100 at the time of the rotation with the great steering angle and by reducing the command torque tc to be transmitted to the rear wheels serving as the auxiliary drive wheels at the time of the rotation with the small steering angle and at the time of the straight travel. In addition, the third torque t3 may be further changed by the vehicle speed S.

(Correction Function)

The controller 32 corrects the command torque tc determined as mentioned above so that the command torque tc is increased as much as the frictional coefficient μ is low, based on the frictional coefficient μ of the road surface estimated by the frictional coefficient estimation unit 324. In the correction, the command torque tc (the command torque before the correction) to which a variable value that is changed so as to be increased as much as the frictional coefficient μ is low is added may be set as the corrected command torque tc (the command torque after the correction), and the command torque tc which is multiplied by a predetermined coefficient k (k>1) may be set as the corrected command torque tc. Furthermore, when the frictional coefficient μ is smaller than a predetermined threshold value, the command torque tc to which a predetermined value is added may be set as the corrected command torque tc. As a result, the driving force distribution can be the four-wheel-drive tendency when the vehicle travels on a low μ road in which the slip easily occurs, and it is possible to suppress the occurrence of the slip.

In a case where the controller 32 has a tight corner braking phenomenon suppressing function of reducing the command torque tc during the rotation with the small rotation radius in order to suppress the occurrence of tight corner braking phenomenon, when the frictional coefficient μ is smaller than a predetermined threshold value, the controller 32 may perform the correction to reduce an amount of reduction for reducing the command torque tc. As a result, during the rotation with the small rotation radius on a low μ road, the suitable driving force can be distributed to the rear wheels 105, and it is possible to suppress the occurrence of the slip.

In the control device 3, the controller 32 controls the electric current output circuit 33 and supplies electric current depending on the corrected command torque tc to the electromagnetic coil 24 of the driving force transmitting device 2 as the excitation current.

(Processing Sequence of Control Device)

Figure 3:
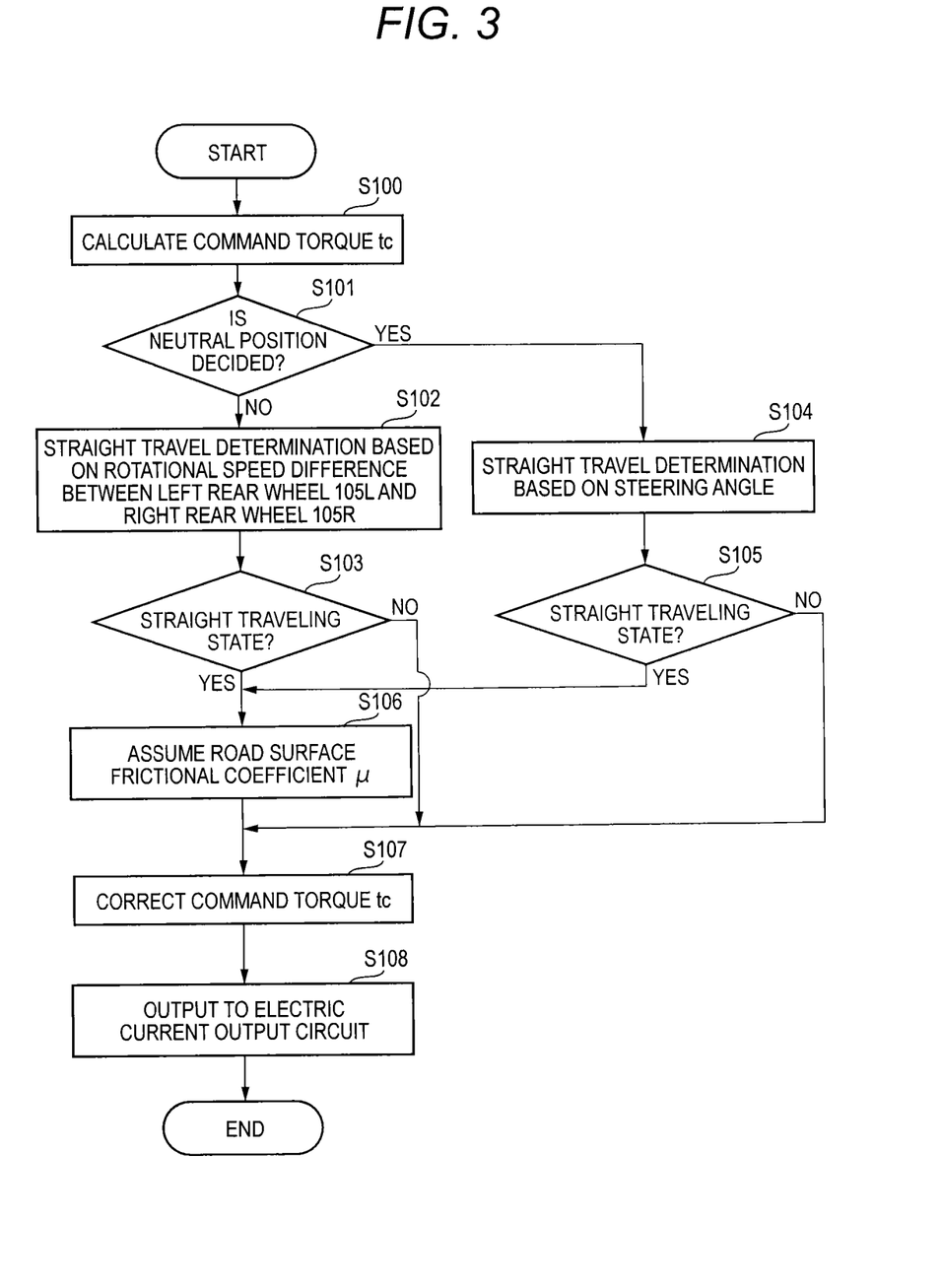
FIG. 3 is a flow chart that illustrates an example of processing carried out by a controller of the control device.

FIG. 3 is a flow chart that illustrates an example of processing carried out by the controller 32 of the control device 3 as the first straight travel determination unit 321, the second straight travel determination unit 322, the selection unit 323, the frictional coefficient estimation unit 324 and the driving force calculation unit 325. The controller 32 repeatedly carries out the processing shown in the flow chart for each predetermined control cycle (for example, 100 ms).

Firstly, the driving force calculation unit 325 calculates the first torque t1 depending on the rotational speed difference $\Delta V$ with reference to the first torque map 311 by the normal control function, calculates the second torque t2 depending on the drive torque with reference to the second torque map 312, and calculates the third torque t3 depending on the steering angle with reference to the third torque map 313. Furthermore, the driving force calculation unit 325 calculates the command torque tc by adding the second torque t2 and the third torque t3 to the first torque t1 (step S100).

Next, the selection unit 323 determines whether or not the neutral position of the steering angle is decided (step S101).

When the neutral position of the steering angle is not decided (S101: No), the first straight travel determination unit 321 determines whether or the vehicle is in a straight traveling state based on a difference between the rotational speed of the left rear wheel 105L and the rotational speed of the right rear wheel 105R (step S102). When the neutral position of the steering angle is decided (S101: Yes), the second straight travel determination unit 322 determines whether or not the vehicle is in the straight traveling state based on the steering angle calculated based on the detection signal of the steering angle sensor 300 (step S104).

When the first straight travel determination unit 321 determines that the vehicle is in the straight traveling state (step S103: Yes) or when the second straight travel determination unit 322 determines that the vehicle is in the straight traveling state (step S105: Yes), the frictional coefficient estimation unit 324 estimates the frictional coefficient $\mu$ of the road surface (step S106).

Meanwhile, when the first straight travel determination unit 321 determines that the vehicle is not in the straight traveling state (step S103: No) or when the second straight travel determination unit 322 determines that the vehicle is not in the straight traveling state (step S105: No), the estimation of the frictional coefficient $\mu$ of the road surface by the frictional coefficient estimation unit 324 is not performed. In this case, the frictional coefficient $\mu$ is not updated from the frictional coefficient $\mu$ in the previous control cycle.

Next, the driving force calculation unit 325 corrects the command torque tc calculated at step S100 based on the frictional coefficient $\mu$ using the above-described correction function (step S107).

The driving force calculation unit 325 outputs a signal of the command torque tc having been corrected to the electric current output circuit 33 (step S108) and finishes the processing.

(Function and Effect of Embodiment)

According to the embodiment mentioned above, since the straight travel determination is performed based on the rotational speed difference between the left rear wheel 105L and the right rear wheel 105R when the neutral position of the steering angle is not decided, even in a situation where the straight travel determination using the steering angle is not performed due to the non-decision of the neutral position, it is possible to determine whether or not the four-wheel-drive vehicle 100 is in the straight traveling state. Moreover, when it is determined that the vehicle is in the straight traveling state, the frictional coefficient $\mu$ of the road surface can be suitably estimated based on the rotational speed difference between the front wheels 104 and the rear wheels 105. As a result, after the ignition of the four-wheel-drive vehicle 100 is turned on to start the traveling, even before the neutral position of the steering angle is decided, it is possible to perform the correction of the command torque tc based on the frictional coefficient $\mu$ of the road surface, and the traveling of the four-wheel-drive vehicle 100 can be stabilized.

Another Embodiment

As mentioned above, although the driving force distribution control device and the four-wheel-drive vehicle of the present invention have been based on the embodiment mentioned above, the present invention is not limited to the embodiment mentioned above but can be carried out in various forms without departing from the gist thereof.

For example, in the embodiment mentioned above, although a case has been described where the frictional coefficient $\mu$ estimated by the frictional coefficient estimation unit 324 is used for a driving force distribution control by the controller 32 in the control device 3, information of the frictional coefficient $\mu$ may be output to another control device or the like. For example, the information of the frictional coefficient $\mu$ may be output to the steering device 4, and the steering device 4 may perform the adjustment or the like of steering assist force based on the information of the frictional coefficient $\mu$. In this case, the control device 3 functions as a road surface frictional coefficient assumption device.

In the embodiment mentioned above, although a case has been described where each function of the first straight travel determination unit 321, the second straight travel determination unit 322, the selection unit 323, the frictional coefficient estimation unit 324, and the driving force calculation unit 325 is realized by the operation of the controller 32 according to program 310, the functions of the first straight travel determination unit 321, the second straight travel determination unit 322, the selection unit 323, the frictional coefficient estimation unit 324, and the driving force calculation unit 325 may be realized by hardware such as an ASIC (Application Specific Integrated Circuit).

In the embodiment mentioned above, a case has been described where the front wheels 104 are the main drive wheels and the rear wheels 105 are the auxiliary drive wheels. However, it is also possible to apply the present invention to a four-wheel-drive vehicle in which the front wheels 104 are the auxiliary drive wheels and the rear wheels 105 are the main drive wheels, without being limited thereto.

According to an aspect of the invention, even if the neutral position of the steering angle is not decided, it is possible to estimate the road surface frictional coefficient.

What is claimed is:

1. A four-wheel-drive vehicle comprising:
   a drive source configured to generate a driving force;
   a driving force transmitting device;
   left and right main drive wheels to which the driving force is always transmitted when the driving force of the drive source is transmitted;
   left and right auxiliary drive wheels to which the driving force is transmitted by the driving force transmitting device depending on a traveling state of the vehicle;

a steering device configured to steer the left and right main drive wheels depending on an operation of a steering wheel;

a steering angle sensor configured to detect a steering angle of the steering wheel;

a control device configured to obtain the driving force to be transmitted to the auxiliary drive wheels, the control device comprising:

a first straight travel determination unit configured to determine whether or not the vehicle travels straight based on a rotational speed difference between the left and right auxiliary drive wheels;

a second straight travel determination unit configured to determine whether or not the vehicle travels straight based on the steering angle detected by the steering sensor;

a selection unit configured to select one of determination results of the first straight travel determination unit and the second straight travel determination unit for determining whether or not the vehicle travels straight;

a frictional coefficient estimation unit configured to estimate a frictional coefficient of a road surface on which the vehicle travels when the selected determination result indicates that the vehicle travels straight; and a driving force calculation unit configured to calculate the driving force to be transmitted to the auxiliary drive wheels based on the frictional coefficient estimated by the frictional coefficient estimation unit; and the driving force transmitting device configured to transmit the driving force to the auxiliary drive wheels in an amount equal to the calculated driving force.

2. The four wheel drive vehicle according to claim 1, wherein the steering angle sensor comprises a relative angle sensor capable of detecting a rotational direction and a rotational speed of the steering wheel, wherein the second straight travel determination unit is configured to determine whether or not the vehicle travels straight based on a steering angle sensed by the relative angle sensor.

3. A driving force distribution control device mounted on a vehicle including a drive source, a driving force transmitting device, and drive wheels including left and right main drive wheels to which the driving force is always transmitted when driving force of the drive source is transmitted, and left and right auxiliary drive wheels to which the driving force is transmitted by the driving force transmitting device depending on a traveling state of the vehicle, the driving force distribution control device comprising:

a control device configured to obtain the driving force to be transmitted to the auxiliary drive wheels, the control device comprising:

a first straight travel determination unit configured to determine whether or not the vehicle travels straight based on a rotational speed difference between the pair of left and right auxiliary drive wheels;

a second straight travel determination unit configured to determine whether or not the vehicle travels straight based on a steering angle of a steering wheel of the vehicle;

a selection unit configured to select one of determination results of the first straight travel determination unit and the second straight travel determination unit for determining whether or not the vehicle travels straight;

a frictional coefficient estimation unit configured to estimate a frictional coefficient of a road surface on which the vehicle travels when the selected determination result indicates that the vehicle travels straight; and a driving force calculation unit configured to calculate the driving force to be transmitted to the auxiliary drive wheels based on the frictional coefficient estimated by the frictional coefficient estimation unit; and a driving force transmitting device configured to transmit driving force depending on the driving force obtained by the control device to the auxiliary drive wheels.

4. A driving force distribution control device according to claim 3, further comprising a relative angle sensor capable of detecting a rotational direction and a rotational speed of the steering wheel, wherein the second straight travel determination unit is configured to determine whether or not the vehicle travels straight based on a steering angle sensed by the relative angle sensor.

5. A road surface frictional coefficient estimation device comprising:

a first straight travel determination unit configured to determine whether or not a vehicle travels straight based on a rotational speed difference between left and right wheels of the vehicle;

a second straight travel determination unit configured to determine whether or not the vehicle travels straight based on a steering angle of a steering wheel of the vehicle;

a selection unit configured to select one of determination results of the first straight travel determination unit and the second straight travel determination unit for determining whether or not the vehicle travels straight; and a frictional coefficient estimation unit configured to estimate a frictional coefficient of a road surface on which the vehicle travels when the selected determination result indicates that the vehicle travels straight.

6. The road surface frictional coefficient estimation device according to claim 5, wherein the vehicle includes a driving source, a driving force transmitting device, and drive wheels including left and right main drive wheels to which the driving force is always transmitted when driving force of the drive source is transmitted, and left and right auxiliary drive wheels to which the driving force is transmitted by the driving force transmitting device depending on a traveling state of the vehicle, and the first straight travel determination unit determines whether or not the vehicle travels straight based on a rotational speed difference between the left and right auxiliary drive wheels.

7. The road surface frictional coefficient estimation device according to claim 5, wherein the selection unit selects the determination result of the first straight travel determination unit when the first straight travel determination unit determines that the steering angle is not in a neutral position, and the selection unit selects the determination result of the second straight travel determination unit when the second straight travel determination unit determines that the steering angle is in the neutral position.

8. The road surface frictional coefficient estimation device according to claim 5, further comprising a relative angle sensor capable of detecting a rotational direction and a rotational speed of the steering wheel, wherein the second straight travel determination unit is configured to determine whether or not the vehicle travels straight based on a steering angle sensed by the relative angle sensor.

* * * * *